United States Patent
Cheng

(10) Patent No.: US 6,702,049 B2
(45) Date of Patent: Mar. 9, 2004

(54) ELECTRICAL WHEELCHAIR WITH SPLICED FRONT AND REAR WHEEL DRIVE

(75) Inventor: Larry M. Cheng, Taichung (TW)

(73) Assignee: Merits Health Products, Ltd., Taichung (TW)

( * ) Notice: Subject to any disclaimer, the term of this patent is extended or adjusted under 35 U.S.C. 154(b) by 55 days.

(21) Appl. No.: 10/028,762

(22) Filed: Dec. 28, 2001

(65) Prior Publication Data

US 2002/0144847 A1 Oct. 10, 2002

(30) Foreign Application Priority Data

Apr. 10, 2001 (TW) .................................. 90205746 U

(51) Int. Cl.[7] .............................................. B62D 15/00
(52) U.S. Cl. .................... 180/6.6; 180/65.1; 180/907
(58) Field of Search ................................. 180/6.6, 6.48, 180/6.5, 6.58, 907, 208, 65.1

(56) References Cited

U.S. PATENT DOCUMENTS

| | | | | |
|---|---|---|---|---|
| 3,964,713 A | * | 6/1976 | Joslyn et al. | 248/418 |
| 4,951,766 A | * | 8/1990 | Basedow et al. | 180/6.5 |
| 4,992,633 A | * | 2/1991 | Cyphers | 200/81.9 R |
| 5,335,367 A | * | 8/1994 | Adachi et al. | 455/575.7 |
| 5,944,131 A | * | 8/1999 | Schaffner et al. | 180/65.1 |
| 6,129,165 A | * | 10/2000 | Schaffner et al. | 180/65.1 |
| 6,290,011 B1 | * | 9/2001 | Langaker et al. | 180/65.1 |
| 6,375,209 B1 | * | 4/2002 | Schlangen | 280/250.1 |

* cited by examiner

Primary Examiner—Brian L. Johnson
Assistant Examiner—Christopher Bottorff
(74) Attorney, Agent, or Firm—Rosenberg, Klein & Lee

(57) ABSTRACT

The electrical wheelchair with spliced front wheel drive and rear wheel drive of the invention comprises a wheel frame and a chair. The wheel frame has a hollow column with a locating ring on its top and a plurality of locating chute on the ring rim. A semi-circular protrusion is placed on the surface of the locating ring. The wheel frame provides a power rod for controlling the moving direction of the wheelchair. There are two foldable footplates erected, one in the front side and the rear side and the footplate is folded when not in use. Beneath the chair, there is rotary shaft inserted in the hollow column. Along the side of the rotary shaft, there install two locating seats, a control stick passing through the holes of the locating seats. The control stick is operated to engage or disengage the locating ping from the locating chute. On the correspondent opposite position of the locating ring, there installs a micro switch. Releasing the control stick allows changing the direction of the chair along with the footplate. The semi-circular hump will activate the micro switch to change the moving direction of the power rod.

2 Claims, 4 Drawing Sheets

ELECTRICAL WHEELCHAIR WITH SPLICED FRONT AND REAR WHEEL DRIVE

BACKGROUND OF THE INVENTION

1. Field of the Invention

The invention relates to an electrical wheelchair with spliced front and rear wheel drive mechanism, in particular, an improved ergonomically-designed operation method for easy turning the wheelchair around.

2. Description of the Prior Art

The drive method of an electrical wheelchair of the prior art mainly comprises either the front wheel drive or the rear wheel drive. The front wheel drive provides a very sensitive response, easy to operate and turn the wheelchair around, suitable for driving in indoor or an area with limited narrow space. The rear wheel drive maintains constant stability with no displacement, good for driving in outdoor and long journey.

The operation of the front wheel drive and the rear wheel drive differs greatly. The prior art of the electrical wheelchairs are usually outfitted with both the front wheel drive and the rear wheel drive in an attempt to offer the drive a broad choice. This arrangement inevitably adds more loads to the wheelchair and renders the structure more complicated and the price higher.

Another wheelchair is designed with a rotary chair and one drive mechanism, permitting the driver to shift either the front wheel drive or the rear wheel drive as he desires to rotate the wheel chair.

However, this rotary chair design never puts into account the general habit the driver operates the wheelchair. In the practical operation, the driver pushes the shift rod forward to drive forward and pull the shift rod backward to make a reverse movement. The wheelchair can be put in the reverse movement when it is shifted from the front wheel drive to the rear wheel drive. But the driver is used to push the shift rod forward to make the wheelchair in the reverse movement or vice versa, which defies the proper operation and leads to a worry of accident. In short, it is not a good design.

In addition, the rotary chair of the prior art of an electrical wheelchair normally provides the front footplate. When the chair is rotated to the rearward position, there is no footplate for the drive to plate his feet. Furthermore, the protruded footplate becomes a hindrance for parking and collision.

It is clearly seen that there exist many shortcomings in the design of the prior art of an electrical wheelchair, requiring prompt improvement.

Viewing the above mentioned shortcomings the front wheel drive and the rear wheel drive of an electrical wheelchair inheres, the inventor has dedicated for years to the renovation and improvement of the electrical wheel and come with a successful electrical wheelchair with spliced front wheel drive and rear wheel drive.

SUMMARY OF THE INVENTION

The primary object of the invention is to provide an electrical wheelchair with spliced front wheel drive and rear wheel drive. When the chair is rotated, the power shift rod is therefore automatically shifted in the opposite position, convenient for the driver to drive in the way as he is used to be.

Another object of the invention is to provide an electrical wheelchair with spliced front wheel drive and rear wheel drive, easy for the driver to get familiarity with new driving technique in the new electrical wheelchair and attain more safety in driving.

Another object of the invention is to provide an electrical wheelchair with spliced front wheel drive and rear wheel drive with more comfort for the driver to sit on.

The electrical wheelchair with spliced front wheel drive and rear wheel drive of the invention comprises a wheel frame and a chair. The wheel frame is equipped with a hollow column with a locating ring on its top. A semi-circular protrusion is placed on the surface of the locating ring. The wheel frame provides a power rod for controlling the moving direction of the wheelchair. There are two foldable footplates erected, one in the front side and the rear side and the footplate is folded when not in use. Beneath the chair, there is rotary shaft inserted in the hollow column. Along the side of the rotary shaft, there install two locating seats, a control stick passing through the holes of the locating seats. The control stick is locked in the space between two locating seats by the locking mandrel. The mandrel has a hump to form a locating pin which inset in the chute on the periphery of the locating ring. The mandrel is mounted with a recoil spring. On the correspondent opposite position of the locating ring, there installs a micro switch. When the driver wants to change the chair direction, he shifts the control rod, the locating pin departs the locating chute to render the chair a free rotation. At this moment, the locating ring moves simultaneously with the hump which eventually contacts the micro switch and the power stick changes the moving direction according to the ergonomic operation.

BRIEF DESCRIPTION OF THE DRAWINGS

The drawings disclose an illustrative embodiment of the present invention which serves to exemplify the various advantages and objects hereof and are as follows.

DETAILED DESCRIPTION OF THE PREFERRED EMBODIMENT

Figure 1:
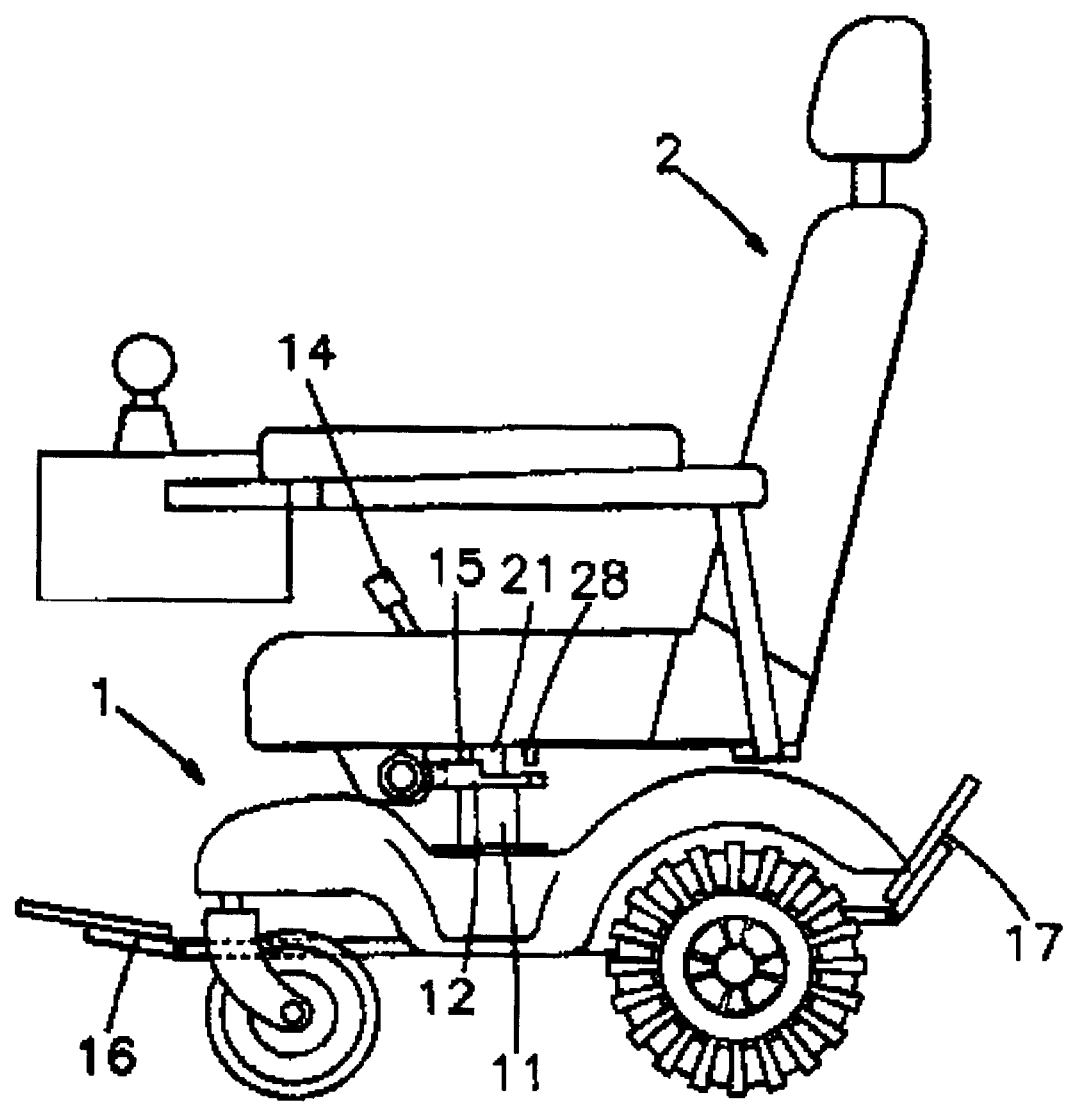
FIG. 1 is a plan showing that the electrical wheelchair of the invention is placed in the rear wheel drive mode.
Figure 2:
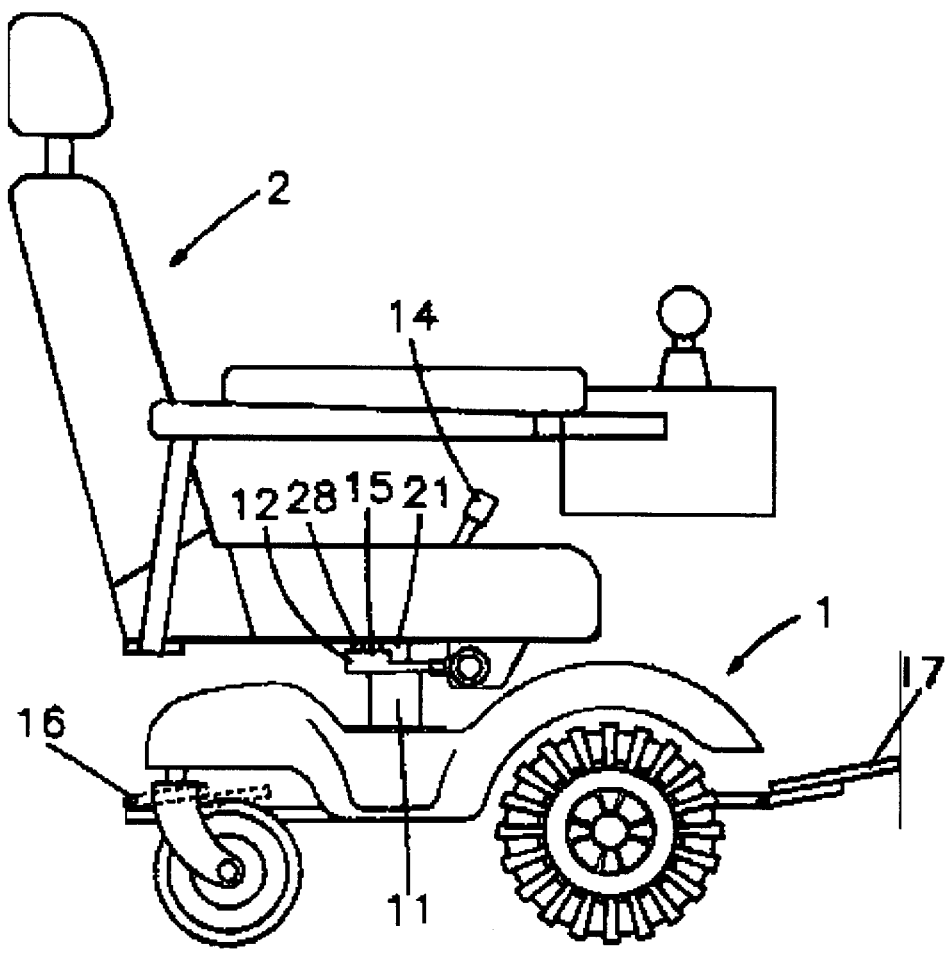
FIG. 2 is a plan showing that the electrical wheelchair of the invention is shifted from the rear wheel drive mode to the front wheel drive mode.
Figure 3:
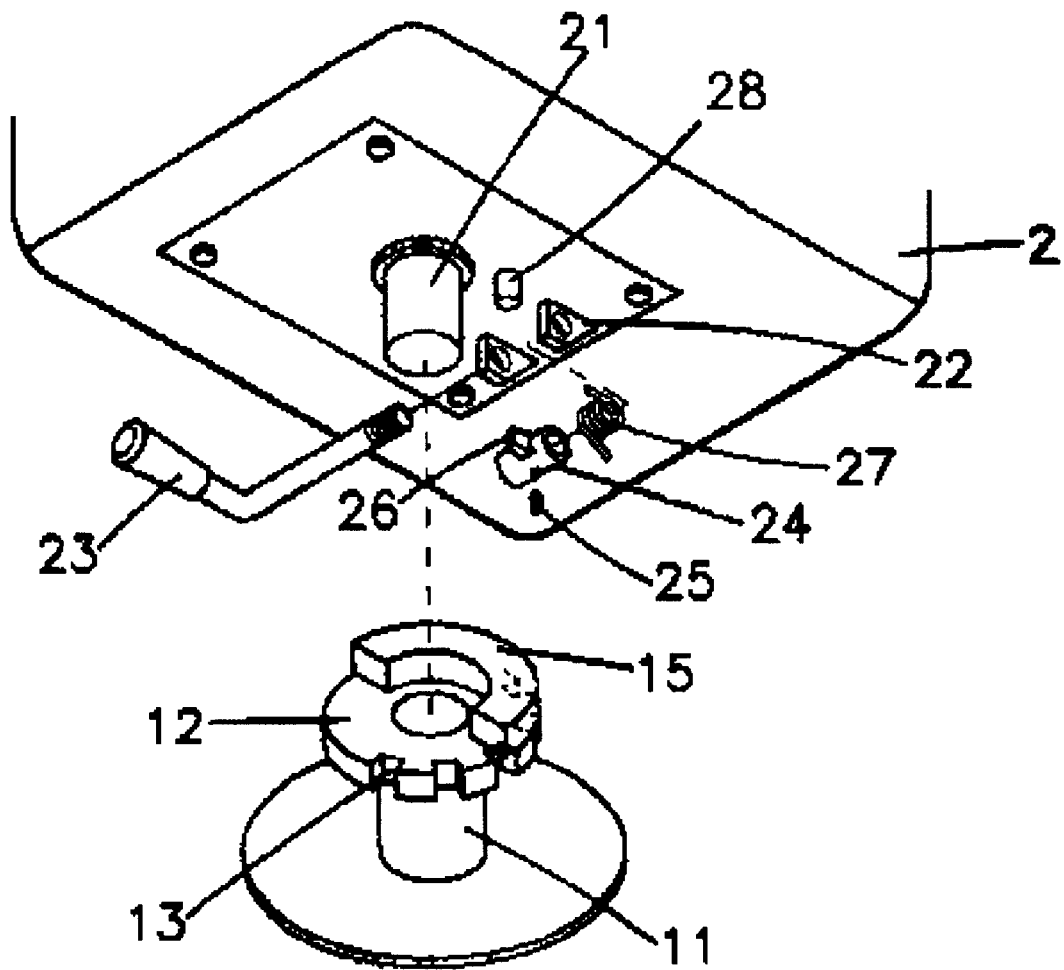
FIG. 3 is a disassembly of the steering mechanism of the chair rotary mechanism of the electrical wheelchair.
Figure 4:
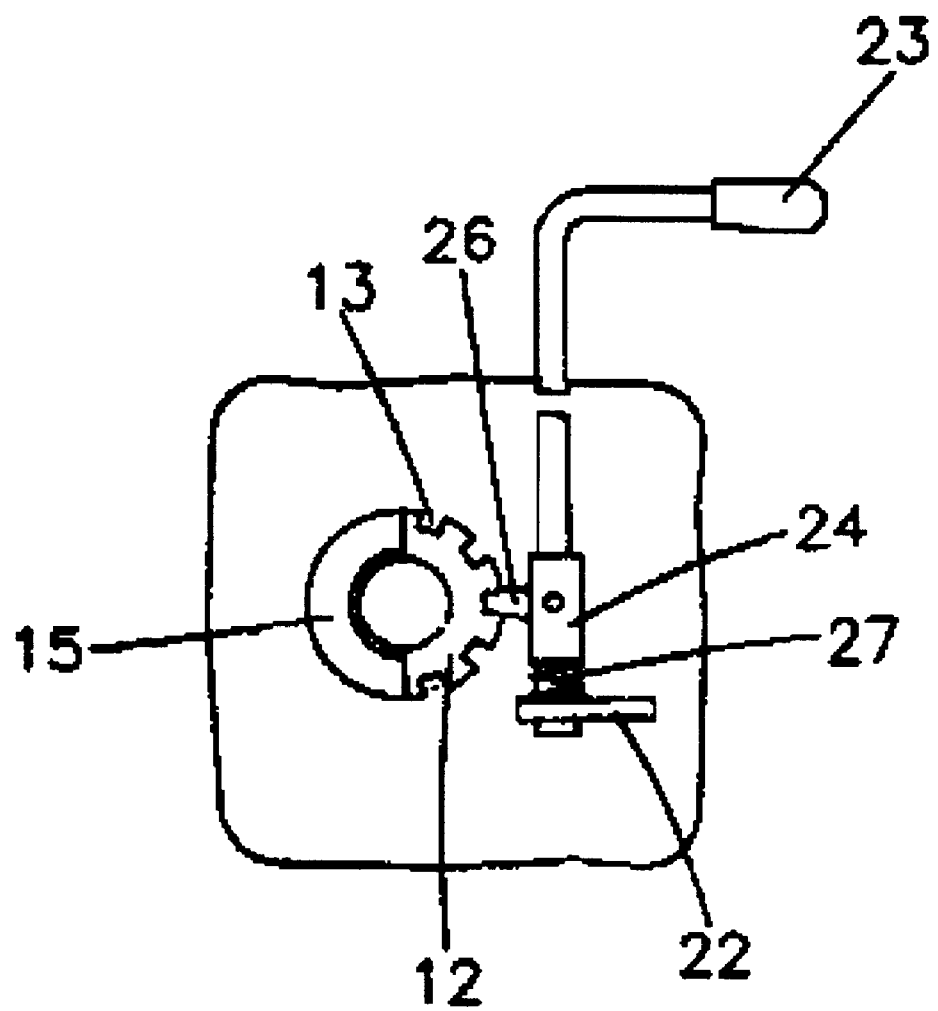
FIG. 4 is an assembly of the steering mechanism of the chair rotary mechanism of the electrical wheelchair.

Please refer to the various drawings attached. The chair rotary mechanism of the electrical wheelchair of the invention constitutes a wheel frame 1, a chair 2 which is rotating on the wheel frame 1. The wheel frame 1 provides a hollow column 11 to receive the rotary shaft 21 extended from the bottom of the chair 2 so as to locate the chair 2 on the wheel frame 1. On the top of the hollow column 11, there is a locating ring 12 with a plurality of locating chutes 13 on the ring rim. On the bottom of the chair 2, there are two locating seats 22. A control stick 23 passes the holes of the locating seats 22. A mandrel 24 is locked on the control stick 23 by a lock screw 25. The locating pin 26 extends outward from the surface of the mandrel 24. The control stick 23 is outfitted with a recoil spring 27 beside the mandrel 24. By rotating the control stick 23, the locating pin 26 will disengage the locating chute 13, permitting the chair 2 to rotate freely. After the control stick 23 is released, the recoil spring 27 will force the locating pin insetting in the chute 13 to lock the chair 2 in place. The power rod 14 controls the forward and backward movement of the wheelchair and the micro switch 28 helps shifting the movement direction. The micro switch 28 is located beneath the chair 2 and above the locating ring 12. On the top of the locating ring 12, there is a semi-circular hump 15. While the locating ring 12 is rotated, the semi-circular hump 15 will move and activate the micro switch 28 to cause the power rod 14 changing the steering direction. The wheel frame 1 provides the front footplates 16, and 17. Both are foldable and can be folded back when not in use.

In the operation, when the chair 2 is set at the preset direction, it simply requires to push forward the power rod 14 to move the wheelchair forward and pull backward the power rod 14 to move the wheelchair backward. At this moment, the front footplate 16 extends outward for use and the rear footplate 17 is folded back not in use. And the hump 15 has not contacted the micro switch 28 yet. When the driver wants to shift the direction of the chair 2, he has to turn the control stick 23 downward to disengage the locating pin 26 from the locating chute 13, and simultaneously rotates the chair 2. When the chair 2 is rotated to the proper position, he releases the control stick 23, the recoil spring 27 will force the locating pin 26 back into the locating chute and locking the chair 2 in place. After the hump 15 contacts the micro switch 28, the latter changes the steering direction of power rod 14. When the power rod 14 is pushed forward, the wheelchair 2 moves backward, or the vice versa. For the driver, the operation procedures remain unchanged. The rear footplate 17 is extended outward for use, and the front footplate 16 is folded.

The electrical wheelchair of the invention provides a spliced front wheel drive and rear wheel drive, permitting automatic shift of power steering direction in couple with the charge of chair direction, offering convenience of the foot plate and keeping the driver in the similar operation procedures even the chair direction is changed. The electrical wheelchair of the invention enhances the comfort, stability and safety in driving.

Many changes and modifications in the above-disclosed embodiment of the invention can, of course, be carried out wit out departing from the scope thereof. Accordingly, to promote the progress in science and the useful arts, the invention is disclosed and is intended to be limited only by the scope of the appended claims.

What is claimed is:

1. An electrical wheelchair with spliced front wheel drive and rear wheel drive comprising:

a wheel frame having opposed front and rear portions, the wheel frame including a hollow column terminating at a locating ring, the locating ring defining a plurality of angularly displaced locating chutes, a semi-circular hump protruding from a portion of the locating ring, the wheel frame including a power rod for actuating directional control thereof;

a chair coupled to the wheel frame in releasably locked manner for selective displacement relative to the wheel frame between at least forward and rearward positions, the chair having a bottom portion and including:
 a rotary shaft extending from the bottom portion to engage the hollow column of the wheel frame;
 at least two locating seats formed on the bottom portion;
 an angularly displaceable control stick passing through the locating seats;
 a mandrel disposed between the locating seats for angular displacement responsive to the control stick, the mandrel having a locating pin extending radially therefrom to releasably engage one of the locating chutes of the locating ring;
 a recoil spring coupled to at least one of the control stick and mandrel for resiliently biasing the locating pin towards engagement with one of the locating chutes; and,
 a micro switch disposed on the bottom portion for selectively reconfiguring the power rod in directional reference between at least forward and rearward configurations, the micro switch being engaged by the semi-circular hump, responsive to the chair being disposed in a preselected one of the forward and rearward positions, to automatically maintain a corresponding one of the forward and rearward configurations for the power rod.

2. The electrical wheelchair with spliced front wheel drive and rear wheel drive of claim 1, wherein the wheel frame is provided with a front foot plate and a rear foot plate each being foldable back in the wheel frame when not in use.

* * * * *